UNITED STATES PATENT OFFICE.

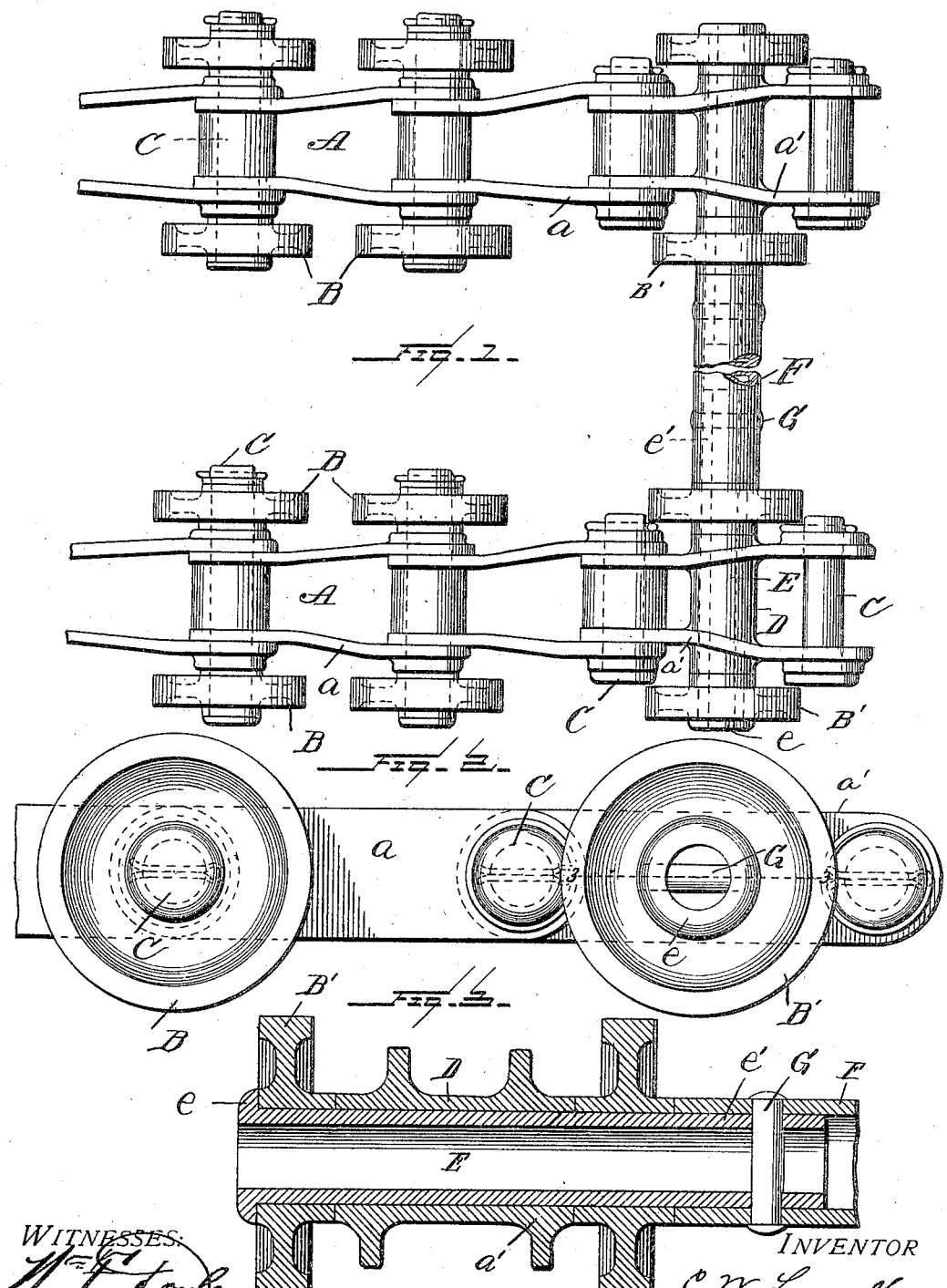

CHRISTOPHER W. LEVALLEY, OF MILWAUKEE, WISCONSIN.

CONVEYER.

No. 812,757. Specification of Letters Patent. Patented Feb. 13, 1906.

Application filed April 12, 1905. Serial No. 255,117.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Conveyers, of which the following is a specification.

Figure 1 is a top plan view of a short section of a conveyer embodying my improvements. Fig. 2 is a side view of the same, and Fig. 3 is a transverse section taken on the line 3 3 of Fig. 2.

My invention is a conveyer comprising two parallel lines of power or conveyer chains and connecting cross members which are adapted to serve as supports for material to be transported or conveyed by the apparatus.

The invention is particularly adapted for use in connection with apparatus for sterilizing bottles, either filled or empty, for cooking material which in suitable receptacles is by the conveyer passed slowly through a chamber that is maintained at a heat sufficient to effect the desired cooking.

In the accompanying drawings, A A designate two lines of chains. The chains may be of any desired or preferred construction, though I prefer under some circumstances to employ chains such as represented in the drawings, comprising the articulated links *a* and the supporting-rollers B, the latter being arranged in pairs on a common axis with the chain between them in order to secure a wide support or base for each chain. These rollers are shown as being supported upon the pintles C, that serve to unite the links. Certain of the links *a'* are provided with bearings arranged intermediate the bearings in the side bars through which pass the connecting-pintles C. In these bearings are mounted the pins E, arranged to constitute the supports for the wheels B' B'. The pintles C at the ends of the links *a'* do not carry supporting-wheels B when the wheels B' are present. In practice every fifth or sixth link of the chain will be like that represented at *a'*. Each of these links has a bearing D for a pin or shaft E, such bearing by preference being continuous, connecting the side bars, and extending outward suitable distances beyond their outer faces to constitute working faces for the hubs of the wheels B', which latter should track with the wheels B. The pin or shaft E, upon which the wheels B' are mounted, is preferably provided at one end with a head *e*, while its opposite end *e'* projects a distance beyond the inner wheel B' sufficient to constitute a means of connection with a hollow cross-shaft F, adapted to be connected at its ends with the projecting ends *e'* of two opposite pins E and to constitute both a cross connection between the two parallel lines of chain and also a support for the articles to be transported. The ends of the cross-shaft F preferably fit over the projecting ends of the pins or shafts E and the two are united by keys or pins G.

In order to provide for the passage of air through the shaft F, I may make the pins E hollow. By this arrangement I can prevent the shaft F becoming undesirably heated.

The construction which I have shown permits the connecting rods or shafts F being connected with or separated from the chains rapidly and expeditiously and permits the use of stock material for these parts which may be cut to any desired length to suit the distance desired between the chains.

By mounting the pins, as shown, in specially-constructed links, such as indicated at *a'*, and providing them with widely-separated roller-bearings I produce a strong and rigid connection for the cross rods or shafts F and at the same time permit the removal of these connecting rods or shafts without in any wise disturbing the chains or their supporting-rollers.

Having described my invention, what I claim, and desire to secure by Letters Patent, is—

1. In a conveyer, the combination of two parallel lines of chains, certain of the links whereof are provided with bearings extending across the links from side bar to side bar and arranged intermediate the joints of articulation of those links, pins mounted in the said bearings and projecting inward from the sides of the chains, and separable connecting-rods between the chains secured at their ends to the said inward-projecting pins, substantially as set forth.

2. In a conveyer, the combination of a pair of parallel chains, pins mounted in the side bars of certain of the links of the chains and disposed intermediate the joints of articulation of those links and having their free ends extending inward beyond the sides of the chains, supporting-rollers mounted upon the said pins, and separable connecting-bars between the chains secured at their ends to the said pins, substantially as set forth.

3. In a conveyer, the combination of two parallel lines of chains, certain of the links of which chains are provided with bearings D, disposed intermediate the joints of articulation of those links, pins E mounted in the said bearings, wheels B', B', mounted upon the said pins E, the inner ends of the pins extending beyond the inner wheels B', and the hollow connecting shafts or rods F arranged between the lines of chains and fitting over the projecting ends of the pins E, and means for uniting the shafts with the ends of the pins, substantially as set forth.

4. In a chain conveyer, the combination of a chain having supporting wheels or rollers, the wheels being arranged in pairs on a common axis coincident with the axis at a joint connection of the links and upon opposite sides of the chain, pins mounted in certain of the links at points intermediate the joint connections of such links with other links of the chain, the ends of such pins extending beyond the side bars of the links, separable bars arranged to support material to be transported secured to the projecting ends of the said pins and supporting wheels or rollers mounted upon the said projecting pins between the side bars of the links and the ends of the separable bars that are secured to the pins, substantially as set forth.

5. In a chain conveyer, the combination of a chain comprising articulated links, supporting-rollers for the chain mounted in pairs on the axes of the joints of the connected links and disposed on the opposite sides of the chain, pins mounted in certain of the links at points intermediate the joint connections of such links with other links of the chain, supporting-rollers mounted upon the said pins, the ends of the pins projecting beyond the said rollers, and separable bars secured to the projecting ends of the said pins and arranged to support the material to be transported by the conveyer, substantially as set forth.

CHRISTOPHER W. LEVALLEY.

Witnesses:
WM. C. FRYE,
V. I. KLOFAUDA.